US005441796A

United States Patent [19]

Steidinger et al.

[11] Patent Number: 5,441,796

[45] Date of Patent: Aug. 15, 1995

[54] LABEL-EQUIPPED PLY WITH READABLE LINER AND METHOD

[75] Inventors: David J. Steidinger, Lake Zurich; Mark S. Steidinger, McHenry, both of Ill.

[73] Assignee: Tamarack Products, Inc., Wauconda, Ill.

[21] Appl. No.: 258,350

[22] Filed: Jun. 10, 1994

[51] Int. Cl.[6] .................... B32B 3/00

[52] U.S. Cl. .................... 428/195; 428/42; 428/43; 428/76; 428/174; 428/187; 428/481; 428/537.5; 283/81; 283/100

[58] Field of Search .................... 428/40, 41, 343, 195, 428/42, 43, 76, 174, 187, 481, 537.5; 462/25, 67; 283/81, 100

[56] References Cited

U.S. PATENT DOCUMENTS

| | | | |
|---|---|---|---|
| 3,383,121 | 5/1968 | Singer | 282/28 |
| 4,277,089 | 1/1979 | Lockhart | 282/27 R |
| 5,005,874 | 4/1991 | Matsuguchi et al. | 283/101 |
| 5,352,155 | 12/1994 | Fahey | 462/25 |
| 5,376,418 | 12/1994 | Rogers et al. | 428/40 |

*Primary Examiner*—Patrick J. Ryan
*Assistant Examiner*—William A. Krynski
*Attorney, Agent, or Firm*—Tilton, Fallon, Lungmus & Chestnut

[57] ABSTRACT

A label-equipped ply with readable liner and method, the ply having a label diecut therein which constitutes only a portion of the ply area, a release backer adhered to the ply back surface and which has an exposed face, the backer being adapted for carrying reverse orientation data imaging on its exposed face and composed of a material capable of being read through the backer.

16 Claims, 1 Drawing Sheet

LABEL-EQUIPPED PLY WITH READABLE LINER AND METHOD

BACKGROUND OF INVENTION

This invention relates to a label-equipped ply with a readable liner and method and, more particularly, where the liner is adapted to be imaged on its reverse side so that the imaging is readable from the front of the ply when the label is removed.

When a label-equipped sheet or continuous web, i.e., a ply, is imaged as by being printed with data, it is often desirable to record data on the release liner of the label as well. Thus, when the label is removed from the release liner, the data is viewable from the front surface of the release liner.

In current practice, this has been accomplished with a self-contained carbonless release liner (such as supplied by 3-M Corporation) which is activated when the label is processed in an impact printer. When the characters of an impact printer strike the label, the impact is transmitted through the label and into the self-contained carbonless liner. This activates self-contained carbonless ink capsules resulting in an image in the release liner corresponding to the impact printed characters on the label. This approach has several disadvantages:

(1) Sales of impact printers are declining: non-impact printing technologies such as laser, ion-deposition, xerography, and magnetography are replacing impact printing in many applications.

(2) A self-contained carbonless release liner incurs considerable extra expense over conventional release liners and the image quality it provides is often poor in terms of contrast.

(3) Incompatibility with non-impact printing technologies—this because there is no impact so no discernible image made on the self-contained carbonless liner.

(4) There is further incompatibility with non-impact printing technologies such as ion-deposition which subject the self-contained carbonless liner to overall pressure which activates some of the self-contained carbonless ink capsules and obscures impact printed data.

(5) In some instances, it may be advantageous to record data on the release liner which does not correspond to that imaged or printed on the face of the label, this not being possible using a self-contained carbonless liner except to the extent that data may be omitted (not transferred to the liner) or obscured by virtue of a zone or strip treatment of the self-contained carbonless ink capsules.

SUMMARY OF INVENTION

It is the object of the present invention to provide a label-equipped ply which can and/or does retain data on the label release liner without the use of a self-contained carbonless liner. Such label-equipped plies are compatible with impact, non-impact, and even conventional printing technologies. This is accomplished by utilizing a release liner affixed to the back of the ply which is "readable".

By "readable", we refer to the fact that imaging on the back surface can be sensed from the front surface by virtue of the liner being able to transmit energy in the electro-magnetic spectrum therethrough. Thus, the imaging may be sensed by such diverse means as magnetic sensors, infra-red sensors and the human eye. Hereinafter, the term "readable" is generic not only to transparent and translucent materials insofar as passage of visible light is concerned but also includes materials which have imaging which is sensible or readable therethrough—as with infra-red or other portions of the spectrum.

In many cases, visual sensing is desirable so that the liner is at least translucent and, optimally, transparent. Translucency is achieved as a result of the thinness and/or chemical treatment (as with glassine) of the release liner. Transparency is obtained with materials such as acetate or plastic films.

The face of the ply may be printed or imaged utilizing impact and/or non-impact printers. The back of the release liner is printed or imaged with reverse-orientation (mirror-image) data utilizing impact or non-impact printers. When the label is removed from the release liner, the mirror-imaged data on the back of the release liner becomes readable, in conventional orientation, from the face of the liner when the label is removed.

This provides several advantages over the current art: (1) a self-contained carbonless release liner is not required, instead, a wide variety of available materials may be utilized as a release liner such as clear plastic films including polypropylene or polyester, clear organic films such as acetate, papers which have been chemically treated to improve transparency such as glassine, papers which are at least translucent by virtue of their thinness which typically also have a release coating to facilitate label removal, and transfer tapes which combine a thin, translucent paper with release coating and pressure sensitive adhesive; (2) compatibility with impact printers which are equipped with reverse orientation or mirror image characters for printing on the back of the release liner; (3) compatibility with non-impact printing technologies such as ion-deposition, laser, magnetography, and xerography, reverse orientation characters and means for coordinating variable information on the face of the ply with the variable information on the back of the release liner being readily available with these technologies; (4) compatibility with conventional printing technologies such as flexography, lithography, letterpress, etc.—again, reverse orientation characters are readily obtained through technology used to print fixed information on the face of the plies and/or back of the release liner; (5) variable or fixed information may be applied to the face of the ply and/or back of the release liners before, during or after manufacture of the label-equipped plies which adds considerable versatility for the users of the invention.

For example, printing or imaging of the plies which advantageously can be business forms and the like can occur (a) during manufacture of the forms—this is particularly beneficial for high production quantities as handling may be minimized; (b) after manufacture of the forms but at the site of manufacture—for example, some forms manufacturers will manufacture a relatively high quantity of forms which lack printed or imaged data and typically, a portion of the forms will be printed or imaged with data for prompt use while the remainder are placed in inventory for later use; (c) after manufacture but at remote locations—for example, the unimaged forms could be delivered to various locations and/or customers and then the imaged forms could be printed or imaged with data and in quantities as required;

A further advantage over the prior art is that (6) the data imaged or printed on the back of the release liner need not correspond to that imaged or printed on the face of the label. For example, it is sometimes advantageous to display additional data on the back of the release liner which by virtue of security, tracking, timing, or conflict with postal regulations is not displayed on the face of the label. Conversely, data may appear on the face of the label and be omitted from the back of the release liner.

BRIEF DESCRIPTION OF DRAWING

The invention is described in conjunction with the accompanying drawing in which.

DETAILED DESCRIPTION

Figures 1, 2:
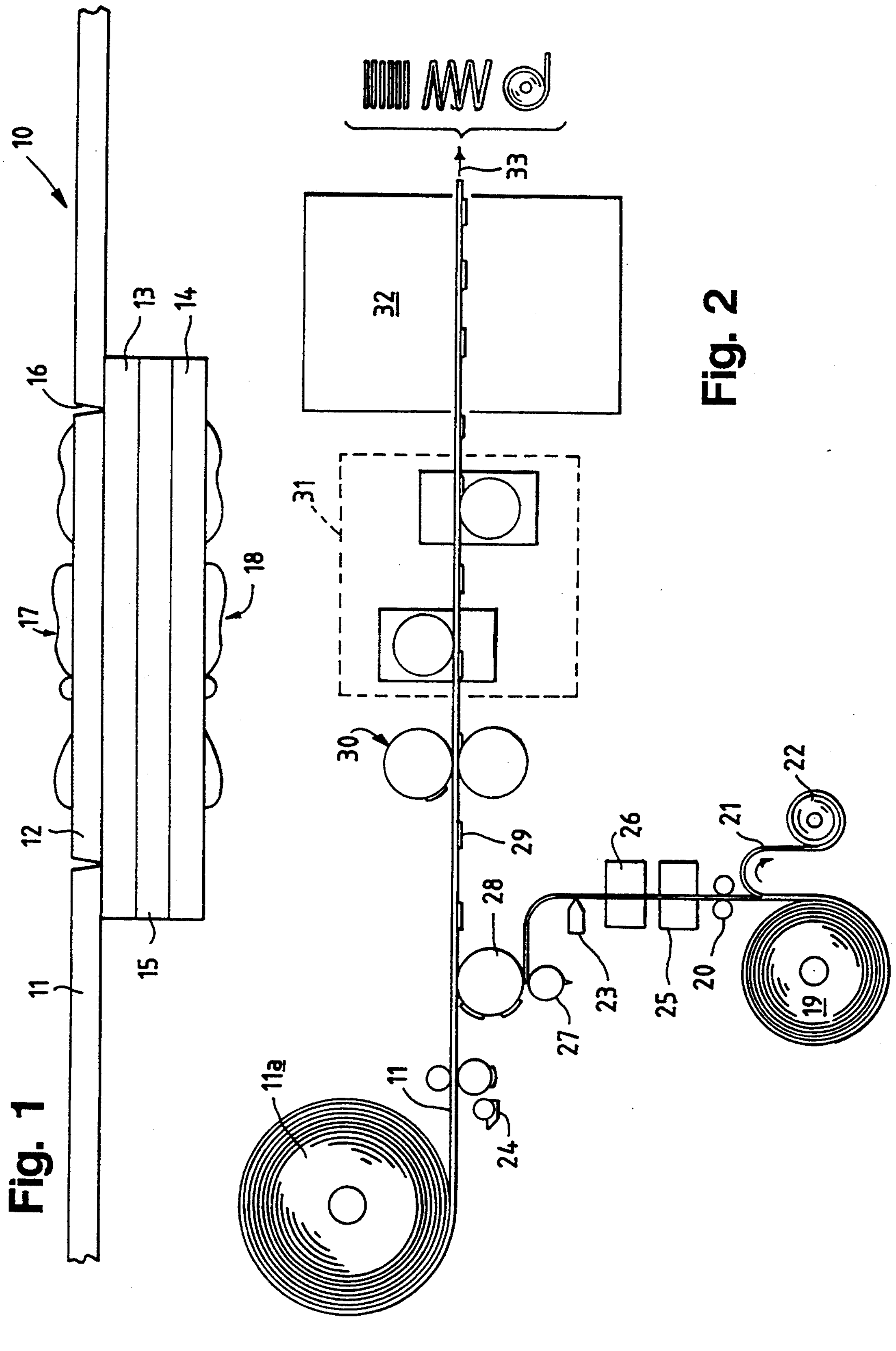
FIG. 1 is a side elevational view with certain portions enlarged or exaggerated to facilitate explanation of the invention.
FIG. 2 is a side elevational schematic view of apparatus employed in the manufacture of the inventive ply according to the inventive method.

In the illustration given and with reference first to FIG. 1, the numeral 10 designates generally the overall device or product incorporating teachings of the invention. As such, it includes a ply 11 which is equipped with a label 12. The label 12 and a further portion of the ply 11 are provided with a pattern coating of pressure sensitive adhesive 13 that generally is larger or greater in extent than the area of the label 12 and thereby extends beyond the perimeter of the label 12 on at least one edge. Conventionally, labels are of a generally rectangular configuration although circular and other shapes are equally useful in the practice of the invention. In any event, the adhesive pattern designated 13 in the illustration given does not have to cover the entire area of the label 12.

The pressure-sensitive adhesive 13 is covered by a backer 14 which may have a release coating 15 arranged in contact with the pattern of adhesive 13. The combination of release coating 15 and backer 14 is often referred to as a release liner. The invention, however, is not limited to such commonly employed release liners as the invention also contemplates combinations of backer material which are constructed and arranged so as to be separable from the pattern of adhesive 13. The backer material 14 is readable—and preferably translucent for most applications. This may be brought about by virtue of its minimal thickness, treatment to improve translucence or the nature of the material itself—again, as an example, many plastic materials such as polyester and polypropylene are transparent.

The release coating 15 can cover the entire top surface of backer 14 or can be patterned or strip coated to leave some areas of the backer without release coating.

The label 12 is obtained from ply 11 and is perimetrically defined by a cut 16. The cut 16, in the preferred embodiment, is cut completely through ply 11 but also may be only cut substantially through ply 11. Further, the cut 16 may be continuous around the perimeter of the label or it may be interrupted by perforations, for example. The cut 16 may further penetrate through the adhesive 13 and the release coating 15 (if any). It is usually desirable that the cut 16 does not penetrate the backer 14. The purpose of the cut 16 is to allow the label 12 to be removed from the ply 11 which is an action usually performed subsequent to manufacture.

The numeral 17 generally designates imaging which may be data on the face of the label 12 by means of impact, non-impact or conventional printing technologies. As used herein, the terms "imaged", "imaging", and the like are employed in a generic sense to cover various technologies of placing information of various kinds on the face of the label and, for that matter, as will be brought out hereinafter on the back of the backer.

Reverse orientation imaging or mirror-imaged data generally designated 18 may be imaged or printed on the back (or bottom) of the backer 14 by means of impact, non-impact or conventional printing technology. The reverse orientation imaging 18 may or may not correspond to the data 17 imaged on the face of the label 12. Both datas 17, 18 may take a variety of sensible forms, viz., alphanumeric, bar code, etc.

Thus, in the preferred embodiment of the invention, when the label 12 is peeled away or otherwise removed from the ply 11:

(1) the pressure sensitive adhesive 13 under the label 12 peels away from the release coating 15 and remains substantially adhered to label 12. This provides means of adhering label 12 onto, for example, a package, product, lab sample, envelope, or another sheet;

(2) the pressure sensitive adhesive 13 which extends beyond the perimeter of the label 12 adheres the backer 14 to ply 11; and (3) the reverse orientation imaging 18 on the back of backer 14 is (a) now viewable in normal orientation, (b) from the face of ply 11 and (c) through the translucent or transparent backer 14.

The reverse orientation imaging 18 will often correspond to the data imaged or printed on the face of the label 17 but could alternatively partially correspond and also contain additional data, partially correspond and contain less data, or not correspond at all.

Method of Manufacture

FIG. 2 illustrates the method of manufacture of the invention when a continuous ply 11 is utilized. It is apparent that as an alternative, individual sheets could be processed by a similar method. As illustrated, the web or ply 11 is fed in a controlled manner from a parent roll designated **11*a*. A patch material 19 is fed in a controlled proportion to ply 11 typically via feed rollers 20 or as an alternative, pin tractors (not shown). The patch material 19 could also be fed so as to be equal to one or both dimensions of the ply 11. The patch material 19** may be one of several alternatives:

(1) It may be a combination of backer 14, pressure sensitive adhesive 13 and release coating 15. This is often referred to as transfer tape and is supplied suitable by Ludlow Corporation located at Two Ludlow Park, Chicopee, Mass. 01021, under designation Wide Web Transfer Tape.

(2) It may be a combination of backer 14, pressure sensitive adhesive 13, release coating 15 and an extra liner 21. This is a variation of transfer tape and is suitably supplied by United Coating Technologies located at 12024 South Aero Drive, Plainfield, Ill. 60544 under designation Free Film Lite. In this case the extra release liner 21 is peeled away and rewound at rewind station 22.

(3) A combination of backer 14 and a release coating 15. This is known as release liner and is available from such suppliers as the Akrosil Division of International Paper Company, 206 Garfield, Menasha, Wis. 54952, 3-M and others. In this case, the pressure-sensitive adhesive can be applied to the release liner at the adhesive coating station 23 or in patterns onto the back of ply 11 by means of a pattern adhesive applicator 24.

(4) A backer 14 which is a paper material. In this case the backer 14 may receive a treatment to improve translucence. This would occur at the translucence treating station 25. The release coating 15 would be applied at the release coating application and curing station 26. The pressure sensitive adhesive 13 would be applied as in (3) above at the adhesive coating station 23 or at the pattern adhesive applicator 24.

(5) A backer 14 which is a film material. This could be a transparent plastic film such as polypropylene or polyester or, as another alternative, acetate film. These films are supplied by Douglas Hanson, Co., located at 1565 Davis Street, Hammond, Wis. 54015 and others. A release coating 15 can be supplied with the film or applied at release coating application and curing station 26. Pressure sensitive adhesive 13 is applied as in (3) or (4) above at adhesive coating station 23 or at the pattern adhesive applicator 24.

It is obvious to those skilled in the art that the sequence and position of some of the operations described in (3) through (5) above could be varied.

The patch material 19 in its various embodiments as described in (1) through (5) above is fed between cut-off cylinder 27 and applicator cylinder 28. The patch material 19 can be severed into individual pieces of liner 29 or can also remain continuous. The liner 29 is conveyed by the applicator cylinder 28 to be adhesively joined to the ply 11 by means of the pressure sensitive adhesive 13.

The adhesively joined liner 29 and ply 11 proceed to a die cut station generally designated 30 which cuts ply 11 as described previously, perimetrically defining the edges of a removable label 12 from ply 11 and generally within the perimeter of each liner 29.

The adhesively joined liner 29 and ply 11 are ready for imaging or printing at this point of manufacture or, alternatively, at a later time and possibly at a remote location by means of an imaging station 31. Imaging station 31 could provide imaging or printing on the face of the label 12 and the back of the backer 14 or, alternatively, on only one of these two surfaces with the remaining surface imaged at another time, at another location, or left unimaged.

The adhesively joined liner 29 and ply 11 may further proceed to a processor 32 which can deliver output 33 such as folded packs, sheets, or rolls. As a further alternative, the adhesively joined liner 29 and ply 11 could be delivered to other machinery, such as a collator for merging with webs, or envelope stuffing and sealing equipment for mailing, sorting, and the like.

While in the foregoing specification, a detailed description of the invention has been set down for the purpose of illustration, many variations in the details hereingiven may be made by those skilled in the art without departing from the spirit and scope thereof.

We claim:

1. A label-equipped ply comprising a ply having a label diecut therein and constituting only a portion of the area of said ply, said ply having front and back surfaces, pressure sensitive adhesive at least over the portion area of said back surface, imaging on said front surface, a release backer adhered to the back surface of said ply and having an exposed face, said backer carrying reverse orientation data imaging on said exposed face and composed of a material capable of being read through said backer.

2. The label-equipped ply of claim 1 in which said backer is translucent.

3. The label-equipped ply of claim 1 in which said backer is transparent.

4. The label-equipped ply according to claim 1 in which said backer is equipped with said reverse orientation data imaging on said exposed face whereby removal of said label enables said imaging to be read from said ply front surface.

5. A label-equipped ply comprising a ply having front and rear surfaces, a release backer adhesively joined to said rear surface and having an exposed face, said backer being at least translucent and carrying reverse orientation data imaging on said exposed face, said ply having a label cut generally within the perimeter of said backer, a coating of pressure sensitive adhesive extending between said ply and said backer.

6. The label-equipped ply according to claim 5 in which said backer is equipped with said reverse orientation data imaging on said exposed face whereby removal of said label enables said imaging to be read from said ply front surface.

7. The label-equipped ply according to claim 5 in which said backer is transparent.

8. The label-equipped ply according to claim 5 in which said ply is a continuous web.

9. The label-equipped ply according to claim 5 in which said ply is an individual sheet.

10. The label-equipped ply according to claim 5 in combination with a series of plies.

11. The label-equipped ply according to claim 5 wherein said backer is equipped with reverse orientation data imaging on said exposed face and said label front surface is equipped with imaging.

12. The label-equipped ply of claim 11 wherein said backer imaging and said label front surface imaging are the same at least in part when said label is removed from said ply and said backer imaging is read from said ply front surface.

13. The label-equipped ply of claim 12 in which said backer imaging and said label front surface imaging are the same.

14. The label-equipped ply of claim 11 wherein said backer imaging and said label front surface imaging are different.

15. The label-equipped ply of claim 5 in which said imaging is a bar code.

16. The label-equipped ply of claim 5 in which said imaging is an alphanumeric image.

* * * * *